Feb. 1, 1938.   A. F. SPILHAUS   2,107,017
AIR CONDITION INDICATOR
Filed April 4, 1935   3 Sheets-Sheet 1
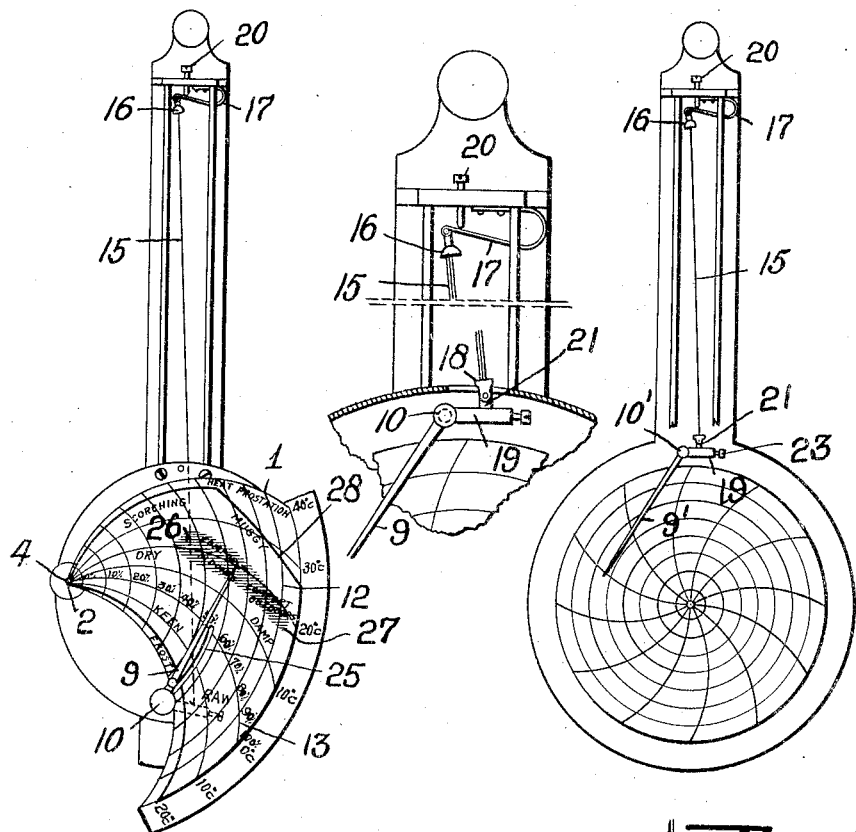
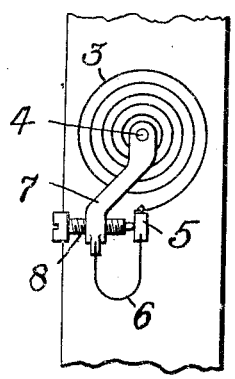
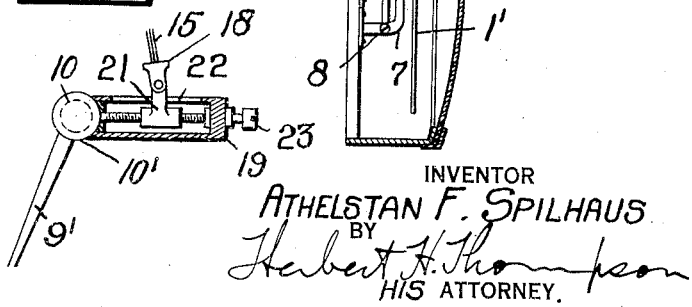
INVENTOR
ATHELSTAN F. SPILHAUS
BY Herbert H. Thompson
HIS ATTORNEY.

Feb. 1, 1938.　　　　A. F. SPILHAUS　　　　2,107,017
AIR CONDITION INDICATOR
Filed April 4, 1935　　　3 Sheets-Sheet 2
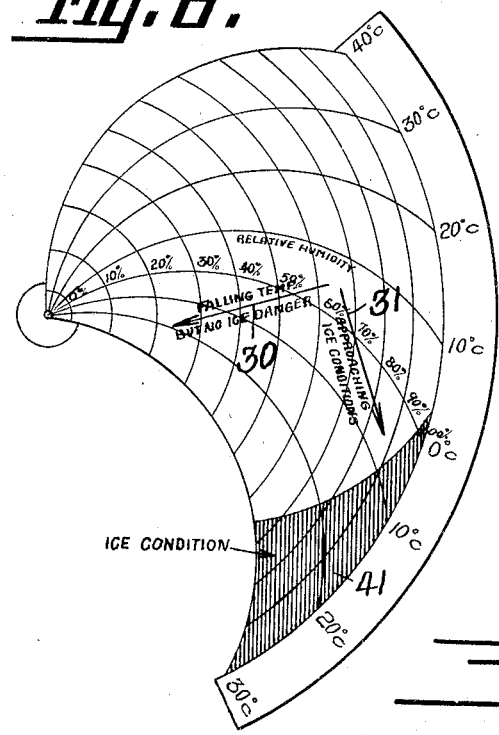
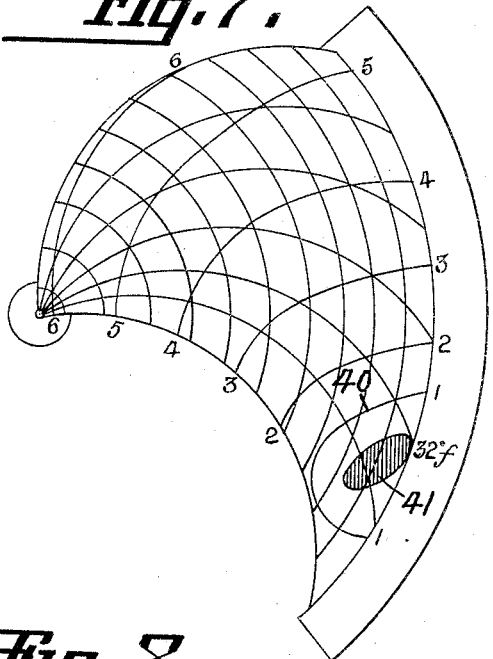
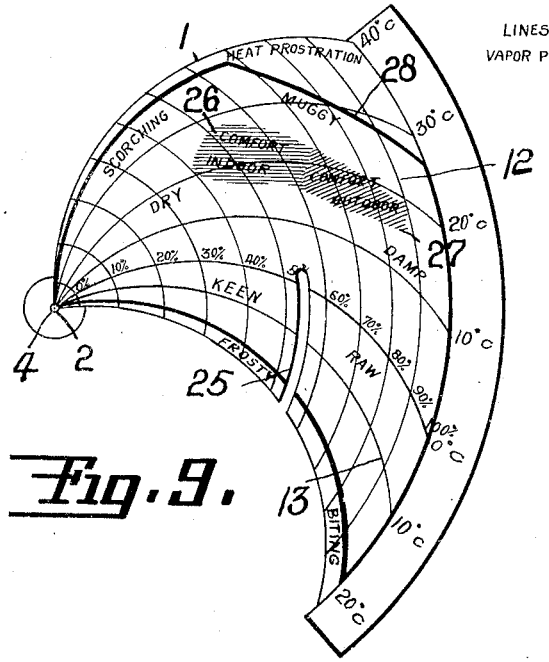
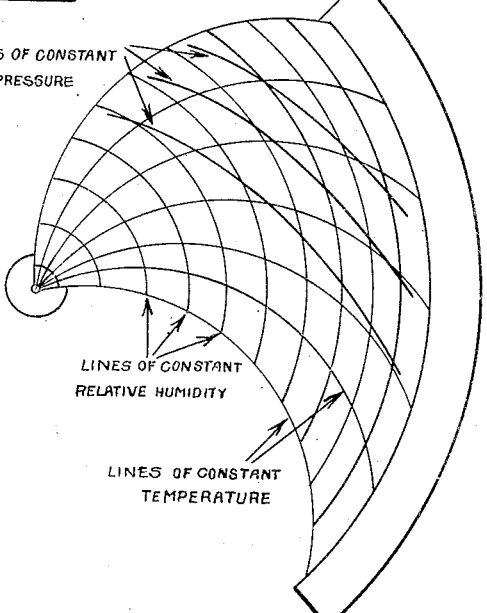
INVENTOR
ATHELSTAN F. SPILHAUS
BY
Herbert H. Thompson
HIS ATTORNEY.

Feb. 1, 1938.   A. F. SPILHAUS   2,107,017
AIR CONDITION INDICATOR
Filed April 4, 1935   3 Sheets-Sheet 3

INVENTOR
ATHELSTAN F. SPILHAUS
BY
Herbert H. Thompson
HIS ATTORNEY.

Patented Feb. 1, 1938

2,107,017

UNITED STATES PATENT OFFICE 2,107,017

AIR CONDITION INDICATOR

Athelstan F. Spilhaus, Cambridge, Mass.

Application April 4, 1935, Serial No. 14,635

1 Claim. (Cl. 73—336)

This invention relates to an indicator for showing atmospheric conditions depending on more than one property of the atmosphere, such as the testing of the air condition indoors or out to ascertain whether it is comfortable to the average person. It has long been known that temperature alone or humidity alone does not determine the proper air condition for a living room or office atmosphere, but that a comfortable condition only prevails when both the temperature and humidity have certain limiting values. Thus, a room temperature of 68° F., if the air is very dry, would feel cool to many people, while if the air were humidified it would feel comfortably warm to the same persons. Also, on a hot day in summer the suffering is greatly increased when the humidity is high, and the same is true on a cold day in winter. In addition, it is well known that the forming of ice on the wings of airplanes is a function not only of temperature, but also of relative humidity. Also, specific humidity is the most conservative of the characteristic properties by which an air mass may be identified, and an instrument which is to be used to determine the particular air mass prevailing at any locality can conveniently be constructed, using the specific humidity as the identifying factor.

By my invention, therefore, I have developed a device which indicates air mass conditions by indicating on one dial the combined temperature and humidity of the atmosphere, and which may show in addition specific humidity, air mass type and equivalent climatic conditions.

In its simplest form, my device consists of two relatively rotatable elements, namely, a dial and a pointer, one of which is rotated by a thermo responsive element and the other by an element responsive to humidity. The dial is graduated in both units and the pointer is read on the dial to show both, thus showing specific humidity. Preferably, the dial also has marked thereon the comfort zone both indoors and outdoors for general use, and it may also have, instead of or in addition to the comfort zone or zones, the ice forming zone or the zone in which ice is likely to form on the wings of airplanes, or other desired zones.

Referring to the drawings showing several forms my invention may assume,

Fig. 1 is a face view of an indicator or thermohygrometer made according to my invention, with the cover removed.

Fig. 2 is a similar view of a slightly modified form of the invention, showing a circular dial.

Fig. 3 is a vertical section through the lower portion of the form of the invention shown in Fig. 2.

Fig. 4 is a detail showing the hair hygrometer portion of the device.

Fig. 4—A is a detail of Fig. 4, in vertical section.

Fig. 5 is a detail showing how the thermometric element is connected to the dial.

Fig. 6 is an enlarged view showing the dial markings which may be used when it is desired to show ice forming conditions on aircraft.

Fig. 7 shows a similar dial having zones showing proximity to ice forming conditions.

Fig. 8 shows additional markings illustrating constant vapor pressure.

Fig. 9 is an enlarged view of the dial of Fig. 1.

Figure 10:
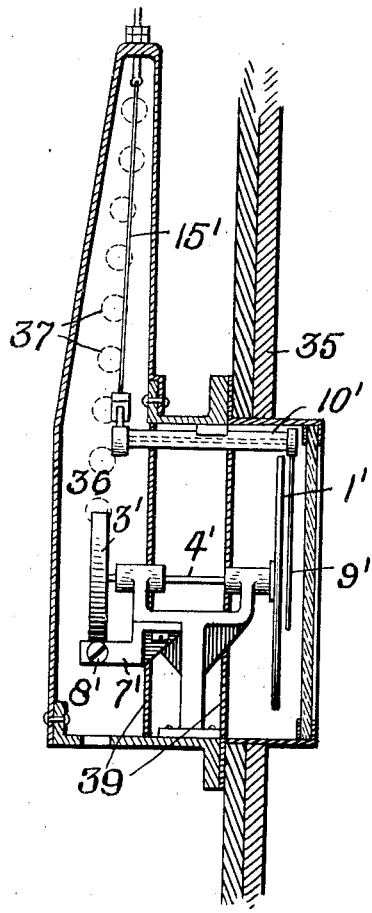

Fig. 10 is a horizontal section of my invention as applied to an ice condition indicator on aircraft.

Figure 11:
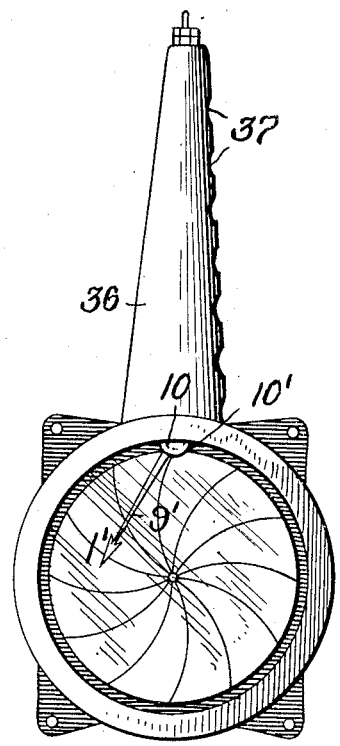

Fig. 11 is a side elevation of the same.

According to my invention, I prefer to rotate a main dial 1 about a center 2 by means of a suitable thermo responsive device, such as a bimetallic spiral thermostatic strip 3 which is attached at its inner end to a spindle 4 which rotates about axis 2 and carries the dial 1. The outer end is shown as secured to a block 5 connected by a relatively stiff U-shaped spring 6 to a fixed arm or bracket 7. Threaded through said arm is a set screw 8, the inner end of which bears against said block 5. It will readily be apparent that by adjusting said screw, the dial may be properly set for the correct zero reading. The dial is preferably graduated about the center 2 in concentric circles 12 representing degrees of humidity from zero % to 100%.

The cooperating index for the dial is a pointer 9 secured to a sleeve 10' rotatably mounted on a pivot pin 10, the length of the pointer being preferably equal to the distance between the centers of rotation of shaft 4 and sleeve 10'. The slot 25 in the disc 1 in Fig. 1 is provided for the shaft 10 of the pointer. The dial is also graduated in arcs 13 struck about 10 as a center, and of a radius equal to the length of the pointer, said arcs representing degrees of temperature, either Fahrenheit or centigrade, as desired, the latter being shown. The pointer is preferably rotated from a humidity responsive device, preferably constructed of a hair or bundle of hairs 15, or some other substance which experiences a change in length due to change in relative humidity. The hairs are shown as stretched between a clamp 16 pivoted on a relatively stiff spring 17 at the top, and at the bottom clamped in a small block 18 pivoted to an arm 19, which is also secured to the sleeve 10' of the pointer 9. The zero position of said pointer may be adjusted by set screw 20, which varies the position of the upper end, and adjustment as to scale may be secured by means of a small nut 21, to which the block 18 is pivoted, which is slidably mounted in a slot 22 in the arm 19 and which may be adjusted by means of the set screw 23 (Fig. 4—A).

For general use, the dial would also be marked into zones to show the conditions of the air as related to human comfort. Thus two shaded zones are shown, 26 for comfort indoors and 27 for comfort outdoors. The dial also shows the points at which heat prostration may occur, which is above the irregular line 28, and such general characteristics of the air as affect the comfort of the average man (Fig. 9). Fog forming conditions may also be readily shown, or zones of insect activity and the like.

The dial of course may be made completely circular, as shown in Fig. 2, if desired, wherein the pointer 9' is pivoted at 10' above the dial.

Figs. 6 and 7 illustrate how the dial may be marked for use on airplanes to show conditions under which ice will form on the wings. By placing arrows or pointers, such as lines 30 and 31 thereon, the aviator may readily see whether he is approaching ice conditions or not as the temperature falls (Fig. 6). In Fig. 7 the approach to ice conditions is shown by zone lines 40 around the ice zone 41.

Lines of constant vapor pressure may also be placed on the chart, as shown in Fig. 8, which lines also show specific humidity.

Figs 10 and 11 illustrate how the invention may be adapted for use on airplanes. In these figures the circular body of the instrument may project through a hole in the wall 35 of the aircraft cabin so that the dial 1' and pointer 9' are visible from inside the cabin. The shafts 4' and 10' of the same in this instance are extended to project outside of the cabin and into a hollow chamber 36 having apertures 37 therein for the ready admission of atmospheric air to obtain the outside temperature and humidity. Therefore the thermo responsive unit 3' and the humidity responsive element 15' will both be exposed to the outside air, but are shielded in a stream line casing 36. Partitions 39 within the casing may be provided so that the temperature within the aircraft cabin will not affect the readings.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

An air condition indicator comprising a chart turnable about a fixed axis and having radiating, angularly spaced thermometric arc graduations thereon, a bi-metallic thermostatic strip having one end connected to said chart for turning the latter, means for movably supporting the other end of said strip for setting said chart to desired zero position, mutually spaced concentric humidity indicating arcs disposed on said chart about the turning axis thereof as a center, a pivoted pointer turnable about an axis common successively to said consecutive thermometric graduations as said chart turns under the action of said bi-metallic strip, a lever arm fixed upon said pointer, a hygroscopic hair element having one end connected to said lever arm for turning said pointer, means for changing the point of connection of said hair element to said lever arm to determine the range of movement of said pointer, means for movably supporting the other end of said hair element for setting the zero position of said pointer, and a zone depicted upon said chart and superimposed on said temperature and humidity indications for indicating a factor, such as human comfort or ice forming conditions.

ATHELSTAN F. SPILHAUS.